US012619593B2

(12) United States Patent
Acharya et al.

(10) Patent No.: US 12,619,593 B2
(45) Date of Patent: May 5, 2026

(54) EFFICIENT COMPUTATION OVER A WIDE TABLE

(71) Applicant: Snowflake Inc., Bozeman, MT (US)

(72) Inventors: Suraj P. Acharya, Newark, CA (US); Yimeng Li, Bellevue, WA (US); Raghavendran Ramakrishnan, Kirkland, WA (US); Chao Tan, Issaquah, WA (US); Yunqiao Zhang, Bellevue, WA (US)

(73) Assignee: Snowflake Inc., Menlo Park, CA (US)

( * ) Notice: Subject to any disclaimer, the term of this patent is extended or adjusted under 35 U.S.C. 154(b) by 0 days.

(21) Appl. No.: 18/755,349

(22) Filed: Jun. 26, 2024

(65) Prior Publication Data

US 2026/0003847 A1     Jan. 1, 2026

(51) Int. Cl.
| | |
|---|---|
| *G06F 7/00* | (2006.01) |
| *G06F 16/22* | (2019.01) |
| *G06F 17/00* | (2019.01) |
| *G06F 21/62* | (2013.01) |

(52) U.S. Cl.
CPC ...... *G06F 16/2282* (2019.01); *G06F 21/6245* (2013.01); *G06F 2221/2113* (2013.01); *G06F 2221/2141* (2013.01)

(58) Field of Classification Search
None
See application file for complete search history.

(56) References Cited

U.S. PATENT DOCUMENTS

| | | | | |
|---|---|---|---|---|
| 11,762,855 | B1 * | 9/2023 | Akidau ............. | G06F 16/24542 707/717 |
| 2020/0394191 | A1 * | 12/2020 | Fender .................. | G06F 16/212 |
| 2022/0253440 | A1 * | 8/2022 | Liu ..................... | G06F 16/24544 |
| 2023/0073347 | A1 * | 3/2023 | Ginsburg ............... | G16H 15/00 |
| 2023/0394016 | A1 * | 12/2023 | Dong .................... | G06F 16/221 |

* cited by examiner

*Primary Examiner* — Tuan A Pham
(74) *Attorney, Agent, or Firm* — Womble Bond Dickinson (US) LLP

(57) ABSTRACT

Embodiments of the present disclosure provide techniques for efficient computation over a wide table. A processing device determines that a first number of columns of a first table is greater than a threshold number of columns. The processing device transforms the first table into a second table based on the determination, where the second table includes a second number of columns that is less than the first number of columns, and where the second table includes a first column that includes first fields that identify columns of the first table, a second column that includes second fields that identify data types of fields of the first table, and a third column that includes third fields that include data of the fields of the first table. The processing device executes a UDTF on the second table.

20 Claims, 10 Drawing Sheets

800

802
DETERMINE THAT A FIRST NUMBER OF COLUMNS OF A FIRST TABLE IS GREATER THAN A THRESHOLD NUMBER OF COLUMNS

804
TRANSFORM THE FIRST TABLE INTO A SECOND TABLE BASED ON THE DETERMINATION, WHERE THE SECOND TABLE INCLUDES A SECOND NUMBER OF COLUMNS THAT IS LESS THAN THE FIRST NUMBER OF COLUMNS, AND WHERE THE SECOND TABLE INCLUDES A FIRST COLUMN THAT INCLUDES FIRST FIELDS THAT IDENTIFY COLUMNS OF THE FIRST TABLE, A SECOND COLUMN THAT INCLUDES SECOND FIELDS THAT IDENTIFY DATA TYPES OF FIELDS OF THE FIRST TABLE, AND A THIRD COLUMN THAT INCLUDES THIRD FIELDS THAT INCLUDE DATA OF THE FIELDS OF THE FIRST TABLE

806
EXECUTE A UDTF ON THE SECOND TABLE

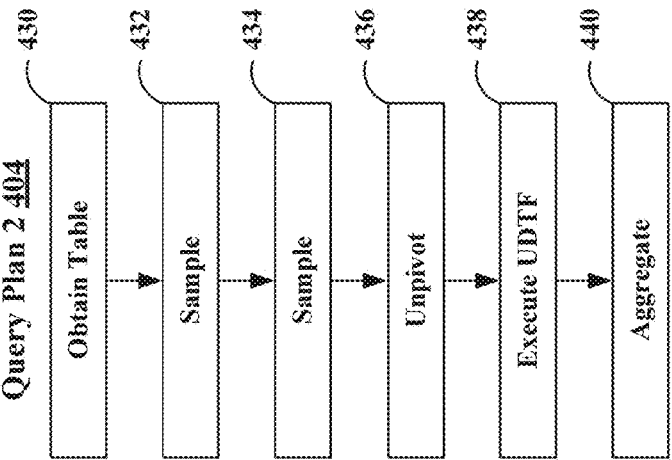
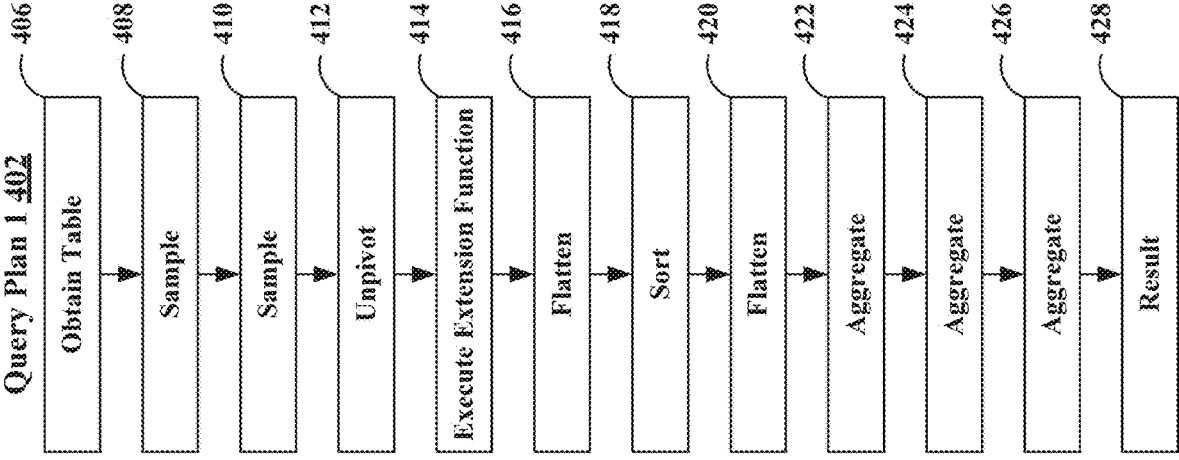
FIG. 4

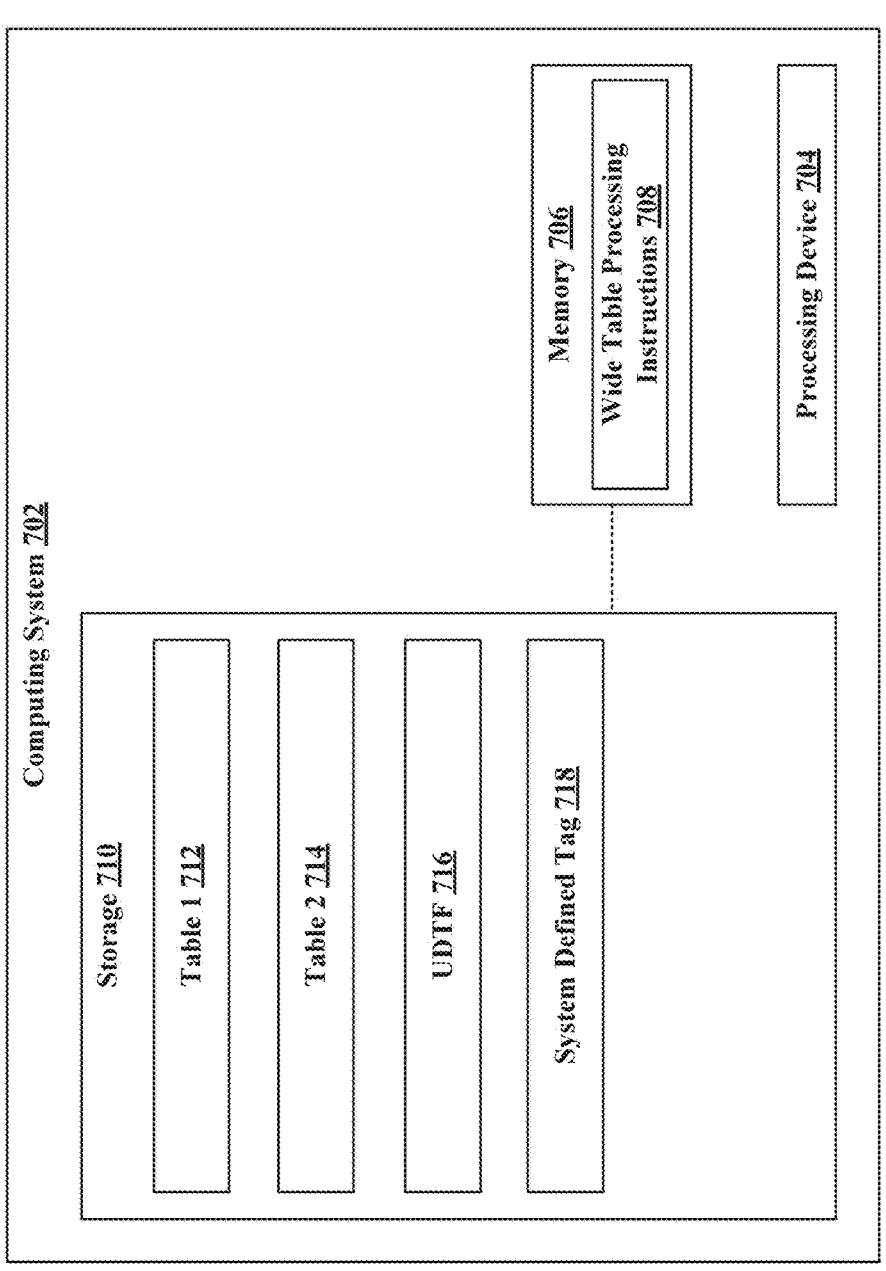
FIG. 7

800

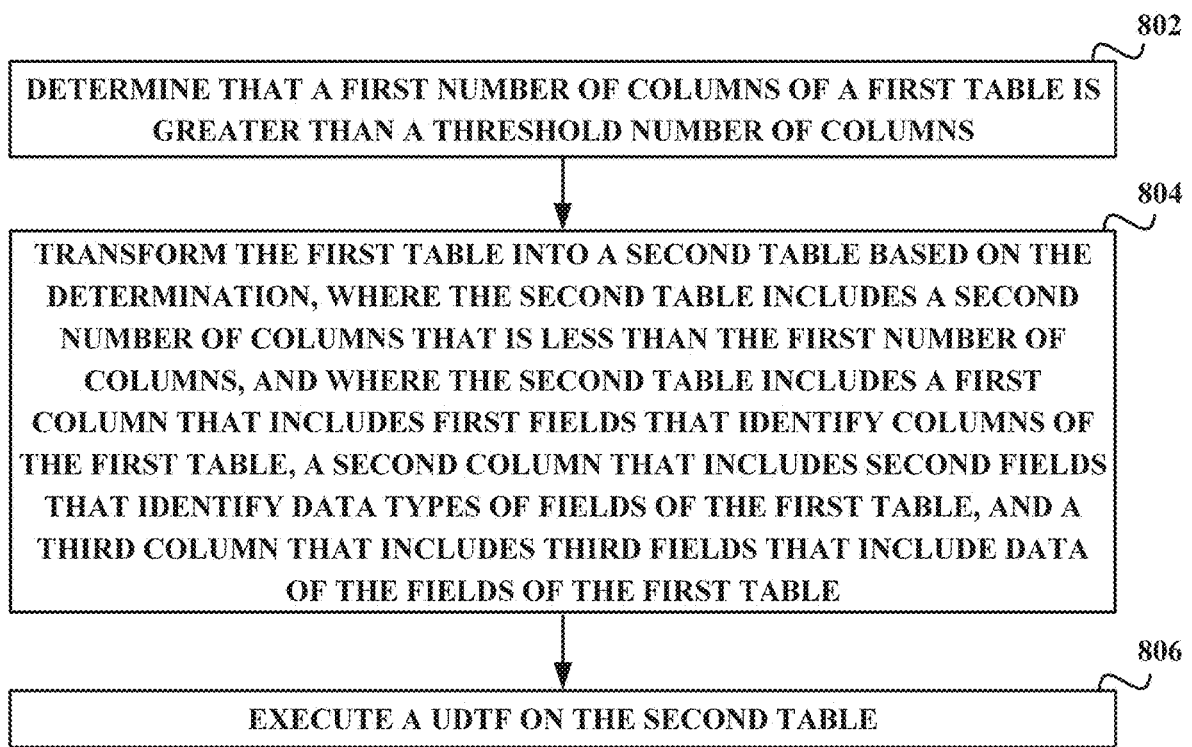

802

DETERMINE THAT A FIRST NUMBER OF COLUMNS OF A FIRST TABLE IS GREATER THAN A THRESHOLD NUMBER OF COLUMNS

804

TRANSFORM THE FIRST TABLE INTO A SECOND TABLE BASED ON THE DETERMINATION, WHERE THE SECOND TABLE INCLUDES A SECOND NUMBER OF COLUMNS THAT IS LESS THAN THE FIRST NUMBER OF COLUMNS, AND WHERE THE SECOND TABLE INCLUDES A FIRST COLUMN THAT INCLUDES FIRST FIELDS THAT IDENTIFY COLUMNS OF THE FIRST TABLE, A SECOND COLUMN THAT INCLUDES SECOND FIELDS THAT IDENTIFY DATA TYPES OF FIELDS OF THE FIRST TABLE, AND A THIRD COLUMN THAT INCLUDES THIRD FIELDS THAT INCLUDE DATA OF THE FIELDS OF THE FIRST TABLE

806

EXECUTE A UDTF ON THE SECOND TABLE

FIG. 8

EFFICIENT COMPUTATION OVER A WIDE TABLE

TECHNICAL FIELD

The present disclosure relates to databases, and particularly to efficient computation over a wide table.

BACKGROUND

Databases are widely used for data storage and access in computing applications. Databases may include one or more tables that include or reference data that may be read, modified, or deleted using queries. Databases may be used for storing and/or accessing personal information or other sensitive information. Secure storage and access of database data may be provided by encrypting and/or storing data in an encrypted form to prevent unauthorized access. In some cases, data sharing may be desirable to let computing devices of entities perform queries against a set of data.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

FIG. 4 is a diagram illustrating an example of a first query plan and an example of a second query plan in accordance with some aspects of the present disclosure.

FIG. 7 is a diagram illustrating an example of a computing system in accordance with some aspects of the present disclosure.

FIG. 8 is a flow diagram of a method for efficient computation over a wide table in accordance with some embodiments of the present disclosure.

DETAILED DESCRIPTION

Figure 1A:
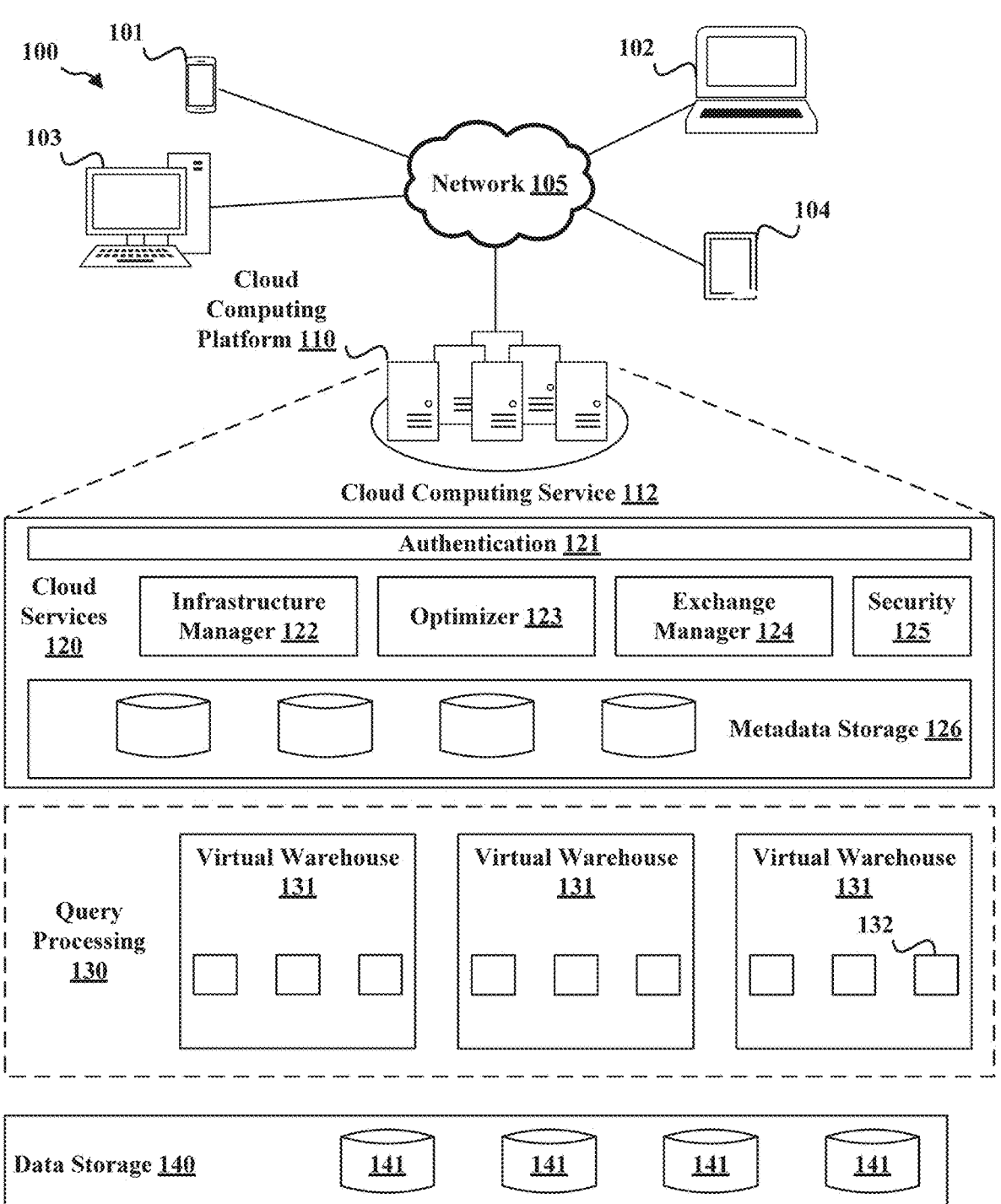
FIG. 1A is a block diagram depicting an example computing environment in which the methods disclosed herein may be implemented in accordance with some aspects of the present disclosure.

Data providers often have data assets that are cumbersome to share, but of interest to another entity. For example, a large online retail company may have a data set that includes the purchasing habits of millions of consumers over the last ten years. If the online retailer wishes to share all or a portion of this data with another entity, the online retailer may need to use old and slow methods to transfer the data, such as a file-transfer-protocol (FTP), or even copying the data onto physical media and mailing the physical media to the other entity. This has several disadvantages. First, it is slow as copying terabytes or petabytes of data can take days. Second, once the data is delivered, the provider cannot control what happens to the data. The recipient can alter the data, make copies, or share it with other parties. Third, the only entities that would be interested in accessing such a large data set in such a manner are large corporations that can afford the complex logistics of transferring and processing the data as well as the high price of such a cumbersome data transfer. Thus, smaller entities (e.g., "mom and pop" shops) or even smaller, nimbler cloud-focused startups are often priced out of accessing this data, even though the data may be valuable to their businesses. This may be because raw data assets are generally too unpolished and full of potentially sensitive data to simply outright sell/provide to other companies. Data cleaning, de-identification, aggregation, joining, and other forms of data enrichment need to be performed by the owner of data before it is shareable with another party. This is burdensome on computational resources, time-consuming, and expensive. Finally, it is difficult to share data assets with many entities because traditional data sharing methods do not allow scalable sharing for the reasons mentioned above. Traditional sharing methods also introduce latency and delays in terms of all parties having access to the most recently-updated data.

Private and public data exchanges may allow data providers to more easily and securely share their data assets with other entities (e.g., data consumers). A public data exchange (also referred to herein as a "Snowflake data marketplace," or a "data marketplace") may provide a centralized repository with open access where a data provider may publish and control live and read-only data sets to thousands of data consumers. A private data exchange (also referred to herein as a "data exchange") may be under the data provider's brand, and the data provider may control who can gain access to the private data exchange. The data exchange may be for internal use only, or may also be opened to data consumers, partners, suppliers, or others. The data provider may control what data assets are listed, as well as control which entities have access to which sets of data. This allows for a seamless way to discover and share data both within a data provider's organization and with its business partners.

The data exchange may be facilitated by a cloud computing service, such as the SNOWFLAKE™ cloud computing service, and allows data providers to offer data assets directly from their own online domain (e.g., website) in a private online marketplace with their own branding. The data exchange may provide a centralized, managed hub for an entity to list internally or externally-shared data assets, to inspire data collaboration, and also to maintain data governance and to audit access. With the data exchange, data providers may be able to share data without copying the data between data consumers (e.g., companies). Data providers may invite other entities to view their data listings, control which data listings appear in their private online marketplace, control who can access data listings, and control how others can interact with the data assets connected to the listings. This may be thought of as a "walled garden"

marketplace in which visitors to the garden must be approved and access to certain listings may be limited.

As an example, Company A has collected and analyzed the consumption habits of millions of individuals in several different categories. Their data sets may include data in the following categories: online shopping, video streaming, electricity consumption, automobile usage, internet usage, clothing purchases, mobile application purchases, club memberships, and online subscription services. Company A may desire to offer these data sets (or subsets or derived products of these data sets) to other entities, thus becoming a data Supplier or data Provider. For example, a new clothing brand may wish to access data sets related to consumer clothing purchases and online shopping habits. Company A may support a page on its website that is or functions substantially similar to a data exchange, where a data consumer (e.g., the new clothing brand) may browse, explore, discover, access and potentially purchase data sets directly from Company A. Further, Company A may control: entities that may enter the data exchange, entities that may view a particular listing, the computer-executable actions that an entity may take with respect to a listing (e.g., view only), and any other suitable action. In addition, a data provider may combine its own data with other data sets from other data providers (e.g., a public data exchange (also referred to as a "data marketplace")), and create new listings using the combined data.

A data exchange may be an appropriate place to discover, assemble, clean, and enrich data to make it more monetizable. A large company on a data exchange may assemble data from across its divisions and departments, which could become valuable to another company. In addition, participants in a private ecosystem data exchange may work together to join their data sets together to jointly create a useful data product that any one of them alone would not be able to produce. Once these joined data sets are created, they may be listed on the data exchange or on the data marketplace.

Sharing data may be performed when a data provider creates a share object (hereinafter referred to as a share) of a database in the data provider's account and grants the share access to particular objects (e.g., tables, secure views, and secure user-defined functions (UDFs)) of the database. Then, a read-only database may be created using information provided in the share. Access to this database may be controlled by the data provider. A "share" encapsulates all of the information required to share data in a database. A share may include at least three pieces of information: (1) privileges that grant access to the database(s) and the schema containing the objects to share, (2) the privileges that grant access to the specific objects (e.g., tables, secure views, and secure UDFs), and (3) the data consumer accounts with which the database and its objects are shared. The data consumer accounts with which the database and its objects are shared may be indicated by a list of references to those data consumer accounts contained within the share object. Only those data consumer accounts that are specifically listed in the share object may be allowed to look up, access, and/or import from the share object. By modifying the list of references of other consumer accounts, the share object can be made accessible to more accounts or be restricted to fewer accounts.

In some embodiments, each share object contains a single role. Grants between this role and objects define what objects are being shared and with what privileges these objects are shared. The role and grants may be similar to any other role and grant system in the implementation of role-based access control. By modifying the set of grants attached to the role in a share object, more objects may be shared (by adding grants to the role), fewer objects may be shared (by revoking grants from the role), or objects may be shared with different privileges (by changing the type of grant, for example to allow write access to a shared table object that was previously read-only). In some embodiments, share objects in a provider account may be imported into the target consumer account using alias objects and cross-account role grants.

When data is shared, no data is copied or transferred between users. Sharing is accomplished through the cloud computing services of a cloud computing service provider such as SNOWFLAKE™. Shared data may then be used to process structured query language (SQL) queries, possibly including joins, aggregations, or other analysis. In some instances, a data provider may define a share such that "secure joins" are permitted to be performed with respect to the shared data. A secure join may be performed such that analysis may be performed with respect to shared data, but the actual shared data is not accessible by the data consumer (e.g., recipient of the share).

A data exchange may also implement role-based access control to govern access to objects within data consumer accounts using account level roles and grants. In one embodiment, account level roles are special objects in a data consumer account that are assigned to users. Grants between these account level roles and database objects define what privileges the account level role has on these objects. For example, a role that has a usage grant on a database can "see" this database when executing the command "show databases;" however, a role that has a select grant on a table can read from this table, but not write to the table. The role would need to have a modify grant on the table to be able to write to the table.

A database may store data in an organized manner. Some databases may store data in a tabular manner, that is, the data is stored in a table that includes columns and rows. In an example, each row of the table may correspond to a different user and each column of the table may correspond to a particular attribute (e.g., age, address, date of birth, etc.). Thus, in the example, a combination of a row and a column may indicate an attribute of a user.

Data in a table may be two-dimensional, that is, the data is represented in rows and columns. However, a computing system may represent data in a linear memory model. When stored according to a linear memory model, the two-dimensional table is projected into a one-dimensional space. The projection may be column-oriented ("a column-oriented database") or row-oriented ("a row-oriented database"). In a column-oriented database, data in a table is stored linearly in-memory according to columns, whereas in a row-oriented database, data in a table is stored linearly in-memory according to rows. Table 1 below illustrates an example table of a database. Table 2 below illustrates an example of how the data of Table 1 is stored linearly in-memory if Table 1 is or is included in a column-oriented database. Table 3 below illustrates an example of how the data of Table 1 is stored linearly in-memory if Table 1 is or is included in a row-oriented database.

TABLE 1

| Example Table of a Database | | | |
|---|---|---|---|
| | Column 1 | Column 2 | Column 3 |
| Row 1 | Entry A | Entry B | Entry C |

TABLE 1-continued

Example Table of a Database

|  | Column 1 | Column 2 | Column 3 |
|---|---|---|---|
| Row 2 | Entry D | Entry E | Entry F |

TABLE 2

Example of Column-Oriented Storage

| Entry A | Entry D | Entry B | Entry E | Entry C | Entry F |
|---|---|---|---|---|---|

TABLE 3

Example of Row-Oriented Storage

| Entry A | Entry B | Entry C | Entry D | Entry E | Entry F |
|---|---|---|---|---|---|

Column-oriented databases and row-oriented databases may have different advantages and disadvantages. In one example, a row-oriented database may be associated with fast random access of rows compared to access of rows in a column-oriented database, whereas a column-oriented database may be associated with a fast random access of columns compared to access of columns in a row-oriented database. In another example, a row-oriented database may be associated with fast insertion of a new row compared to an insertion of a new row in a column-oriented database, whereas a column-oriented database may be associated with a fast insertion of a new column compared to an insertion of a new column in a row-oriented database.

Some computing systems and/or applications may be configured to perform operations on a particular type of database. In an example, a computing system and/or an application is configured to process columns of a table of a database in a serial manner (i.e., on a column-by-column basis). In the example, the computing system and/or the application may leverage parallel computing to process data in a column in an efficient manner. In the example, the operations may include classifying data in a column-oriented database via a user-defined table function (UDTF). A UDTF may refer to a function that can be called (e.g., from a domain-specific language, such as Structured Query Language (SQL)) that returns a tabular value for each input row of a table. A UDTF may be optimized to process data of a column in parallel. However, in some instances, a table may include a relatively large number of columns (e.g., one-thousand columns, ten-thousand columns, one-hundred thousand columns, etc.). In such instances, the computing system and/or the application may process the table on a column-by-column basis in order to perform an operation, which may be inefficient, that is, processing the table on the column-by-column basis may utilize a relatively large number of processor clock cycles due to the relatively large number of columns, leading to a relatively long time for the operation to complete.

The present disclosure addresses the above and other issues by providing techniques for efficient computation over a wide table. With more particularity, the present disclosure describes flattening a "wide table" (e.g., a table with a number of columns greater than a threshold number of columns, such as five-hundred columns, one-thousand columns, five-thousand columns, etc.) into a "narrow table" (e.g., a table with less rows than the "wide table") and leveraging a UDTF to maximize parallel computing over the "narrow table." In an example, a first table may include 1,000 columns and 10,000 rows (i.e., the first table includes 10,000 records and each record includes 1,000 attributes). A computing system may transform (i.e., "flatten") the first table into a second table that includes 3 columns (i.e., a first column, a second column, and a third column) and 10,000, 000 rows, where the first column includes fields (which may also be referred to as "entries" or "cells") that identify names of columns in the first table, the second column includes fields that identify data types (e.g., String, Integer, etc.) of fields in the first table, and the third table includes fields that include the fields (i.e., the data) of the first table. The computing system may call the UDTF (which, as noted above, may be optimized to process data of a column in parallel) to process data of the second table. In some aspects, the UDTF may be associated with classifying data in a data exchange.

In an example, a processing device determines that a first number of columns of a first table is greater than a threshold number of columns. The processing device transforms the first table into a second table based on the determination, where the second table includes a second number of columns that is less than the first number of columns, and where the second table includes a first column that includes first fields that identify columns of the first table, a second column that includes second fields that identify data types of fields of the first table, and a third column that includes third fields that include data of the fields of the first table.

The present disclosure provides for various technical advantages. Vis-à-vis transforming the first table into a second table, where the second table includes a second number of columns that is less than the first number of columns and executing the UDTF on the second table, the processing device may reduce a number of processor clock cycles (and hence an amount of time) used to process the second table compared to a number of processor clock cycles that would be used to execute the UDTF on the first table. In some aspects, the present disclosure may enable a query plan to be run on a first compute node that has less resources than resources of a second compute node in the same amount of time (or less time) than running the query plan on the second compute node. In some aspects in which the UDTF classifies data, the present disclosure may reduce an amount of time to classify data associated with the first table/second table. In such aspects, the present disclosure may reduce an amount of time used for data access, data sharing, and/or policy application (described in greater detail below).

FIG. 1A is a block diagram depicting an example computing environment 100 in which the methods disclosed herein may be implemented in accordance with some aspects of the present disclosure. In particular, a cloud computing platform 110 may be implemented, such as Amazon Web Services™ (AWS), Microsoft Azure™, Google Cloud™, or the like. The cloud computing platform 110 provides computing resources and storage resources that may be acquired (purchased) or leased and configured to execute applications and store data.

The cloud computing platform 110 may host a cloud computing service 112 that facilitates storage of data on the cloud computing platform 110 (e.g., data management and access) and analysis functions (e.g., SQL queries, analysis), as well as other computation capabilities (e.g., secure data sharing between users of the cloud computing platform 110).

The cloud computing platform 110 may include a three-tier architecture: data storage 140, query processing 130, and cloud services 120.

The data storage 140 may facilitate the storing of data on the cloud computing platform 110 in one or more cloud databases 141. The data storage 140 may use a storage service such as Amazon S3™ to store data and query results on the cloud computing platform 110. In particular embodiments, to load data into the cloud computing platform 110, data tables may be horizontally partitioned into large, immutable files which may be analogous to blocks or pages in a traditional database system. Within each file, the values of each attribute or column are grouped together and compressed using a scheme sometimes referred to as hybrid columnar. Each table has a header which, among other metadata, contains offsets of each column within the file.

In addition to storing table data, the data storage 140 facilitates the storage of temporary data generated by query operations (e.g., joins), as well as data contained in large query results. This may allow the cloud computing platform 110 to compute large queries without out-of-memory or out-of-disk errors. Storing query results this way may simplify the query processing 130 as it removes the need for server-side cursors found in traditional database systems.

The query processing 130 may handle query execution within elastic clusters of virtual machines, referred to herein as virtual warehouses or data warehouses. Thus, the query processing 130 may include one or more virtual warehouses 131, which may also be referred to herein as data warehouses. The virtual warehouses 131 may be one or more virtual machines operating on the cloud computing platform 110. The virtual warehouses 131 may be compute resources that may be created, destroyed, or resized at any point, on demand. This functionality may create an "elastic" virtual warehouse that expands, contracts, or shuts down according to needs of a user. Expanding a virtual warehouse involves generating one or more compute nodes 132 to a virtual warehouse 131. Contracting a virtual warehouse involves removing one or more compute nodes 132 from a virtual warehouse 131. More compute nodes 132 may lead to faster compute times compared to less compute nodes 132. For example, a data load which takes fifteen hours on a system with four compute nodes might take only two hours with thirty-two compute nodes.

The cloud services 120 may be a collection of services that coordinate activities across the cloud computing service 112. The cloud services 120 tie together some or all of the different components of the cloud computing service 112 in order to process user requests, from login to query dispatch. The cloud services 120 may operate on compute instances provisioned by the cloud computing service 112 from the cloud computing platform 110. The cloud services 120 may include a collection of services that manage virtual warehouses, queries, transactions, data exchanges, and metadata associated with such services, such as database schemas, access control information, encryption keys, and usage statistics. The cloud services 120 may include, but are not limited to, an authentication engine 121, an infrastructure manager 122, an optimizer 123, an exchange manager 124, a security engine 125, and metadata storage 126.

Figure 1B:
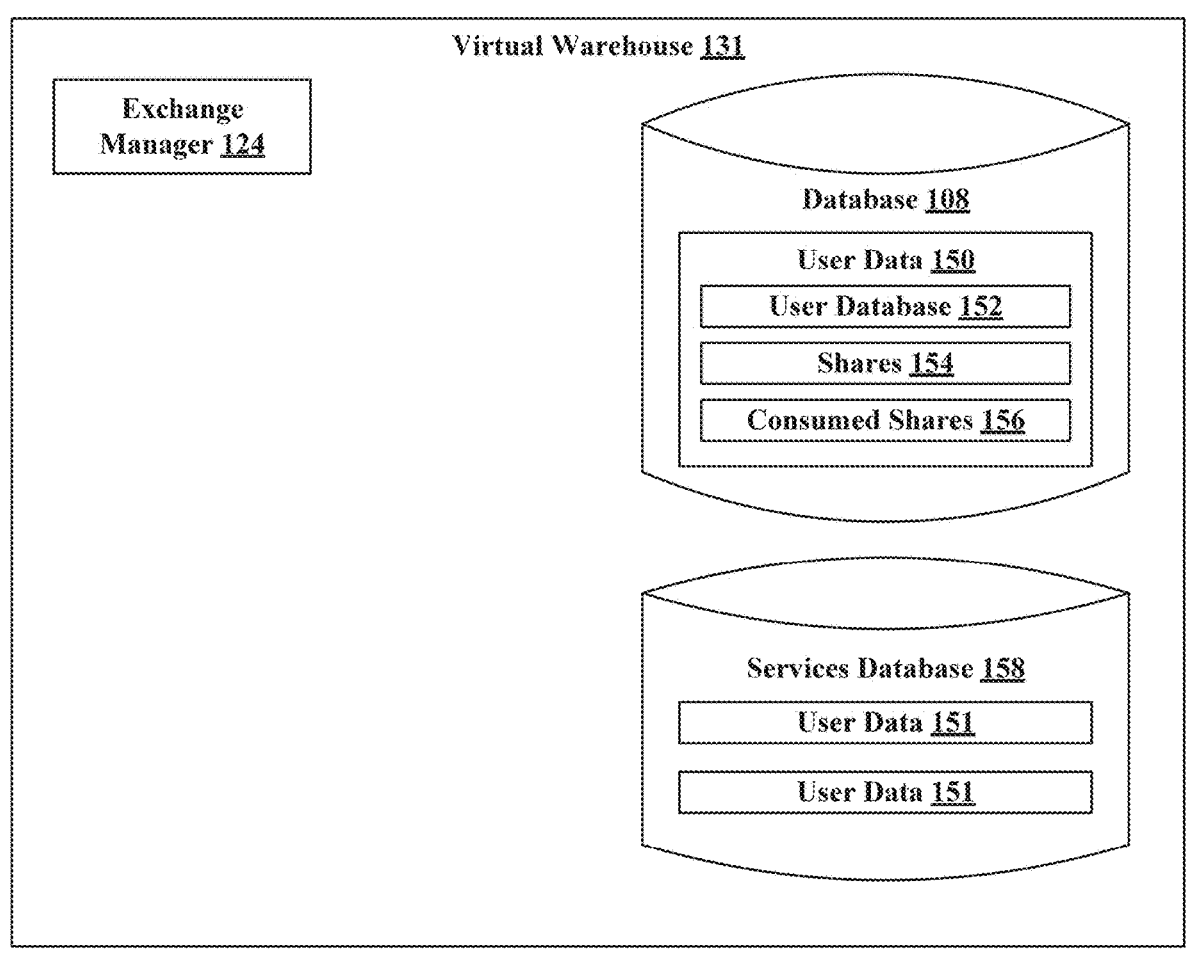
FIG. 1B is a block diagram illustrating an example virtual warehouse in accordance with some aspects of the present disclosure.

FIG. 1B is a block diagram illustrating an example of a virtual warehouse 131 in accordance with some aspects of the present disclosure. The exchange manager 124 may facilitate the sharing of data between data providers and data consumers, using, for example, a data exchange. For example, the cloud computing service 112 may manage the storage and access of a database 108. The database 108 may include various instances of user data 150 for different users (e.g., different enterprises or different individuals). The user data 150 may include a user database 152 of data stored and accessed by that user. The user database 152 may be subject to access controls such that only the owner of the data is allowed to change and access the user database 152 upon authenticating with the cloud computing service 112. For example, data may be encrypted such that the data can only be decrypted using decryption information possessed by the owner of the data. Using the exchange manager 124, specific data from a user database 152 that is subject to these access controls may be shared with other users in a controlled manner. In particular, a user may specify shares 154 that may be shared in a public or data exchange in an uncontrolled manner or shared with specific other users in a controlled manner as described above. A "share" encapsulates all of the information required to share data in a database. A share may include at least three pieces of information: (1) privileges that grant access to the database(s) and the schema containing the objects to share, (2) privileges that grant access to the specific objects (e.g., tables, secure views, and secure UDFs), and (3) data consumer accounts with which the database and its objects are shared. When data is shared, no data is copied or transferred between users. Sharing is accomplished through the cloud services 120 of the cloud computing service 112.

Sharing data may be performed when a data provider creates a share of a database in an account of the data provider and when the data provider grants access to particular objects (e.g., tables, secure views, and secure user-defined functions (UDFs)). A read-only database may be created using information provided in the share. Access to this database may be controlled by the data provider.

Shared data may then be used to process SQL queries, possibly including joins, aggregations, or other analysis. In some instances, a data provider may define a share such that "secure joins" are permitted to be performed with respect to the shared data. A secure join may be performed such that analysis may be performed with respect to shared data, but the actual shared data is not accessible by the data consumer (e.g., a recipient of the share).

User devices 101-104, such as laptop computers, desktop computers, mobile phones, tablet computers, cloud-hosted computers, cloud-hosted serverless processes, or other computing processes or devices may be used to access the virtual warehouse 131 or cloud service 120 by way of a network 105, such as the Internet or a private network.

In the description below, actions are ascribed to users, particularly consumers and providers. Such actions shall be understood to be performed with respect to the user devices 101-104 operated by such users. For example, notification to a user may be understood to be a notification transmitted to user devices 101-104, an input or instruction from a user may be understood to be received by way of the user devices 101-104, and interaction with an interface by a user shall be understood to be interaction with the interface on the user devices 101-104. In addition, database operations (joining, aggregating, analysis, etc.) ascribed to a user (a data consumer or a data provider) shall be understood to include performing of such actions by the cloud computing service 112 in response to an instruction from the user.

Figure 2:
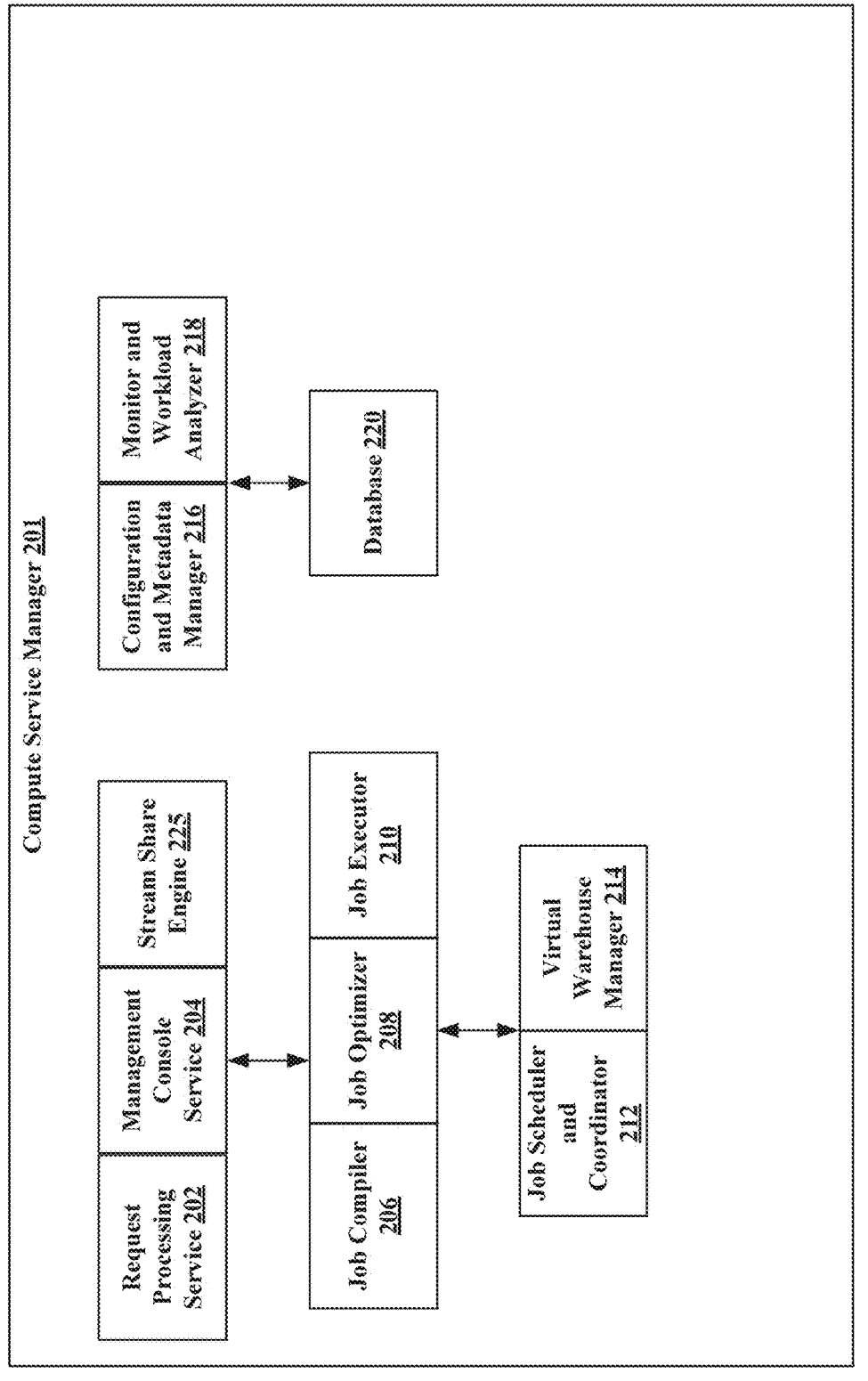
FIG. 2 is a block diagram illustrating components of the compute service manager, in accordance with aspects of the present disclosure.

FIG. 2 is a block diagram 200 illustrating components of a compute service manager 201, in accordance with aspects of the present disclosure. The compute service manager 201 coordinates and manages operations of a network based data warehouse system. The compute service manager 201 performs query optimization and compilation as well as managing clusters of computing services that provide compute resources (e.g., virtual warehouses, virtual machines, EC2 clusters). The compute service manager 201 can support any number of client accounts such as end users providing data storage and retrieval requests, system administrators managing the systems and methods described herein, and other components/devices that interact with the compute service manager 201.

As shown in FIG. 2, a request processing service 202 manages received data storage requests and data retrieval requests (e.g., jobs to be performed on database data). For example, the request processing service 202 may determine the data necessary to process a received query (e.g., a data storage request or data retrieval request). The data may be stored in a cache within an execution platform (described below) or in a data storage device in cloud computing storage platform (e.g., the cloud computing platform 110).

A management console service 204 supports access to various systems and processes by administrators and other system managers. Additionally, the management console service 204 may receive a request to execute a job and monitor the workload on the system. The stream share engine 225 manages change tracking on database objects, such as a data share (e.g., shared table) or shared view.

The compute service manager 201 also includes a job compiler 206, a job optimizer 208, and a job executor 210. The job compiler 206 parses a job into multiple discrete tasks and generates the execution code for each of the multiple discrete tasks. The job optimizer 208 determines the best method to execute the multiple discrete tasks based on the data that needs to be processed. The job optimizer 208 also handles various data pruning operations and other data optimization techniques to improve the speed and efficiency of executing the job. The job executor 210 executes the execution code for jobs received from a queue or determined by the compute service manager 201.

A job scheduler and coordinator 212 sends received jobs to the appropriate services or systems for compilation, optimization, and dispatch to an execution platform. For example, jobs may be prioritized and processed in that prioritized order. In an embodiment, the job scheduler and coordinator 212 determines a priority for internal jobs that are scheduled by the compute service manager 201 with other "outside" jobs such as user queries that may be scheduled by other systems in the database but may utilize the same processing resources in the execution platform. In some embodiments, the job scheduler and coordinator 212 identifies or assigns particular nodes in the execution platform to process particular tasks.

A virtual warehouse manager 214 manages the operation of multiple virtual warehouses implemented in the execution platform. As discussed below, each virtual warehouse includes multiple execution nodes that each include a cache and a processor (e.g., a virtual machine, or an operating system level container execution environment).

The compute service manager 201 includes a configuration and metadata manager 216, which manages the information related to the data stored in the remote data storage devices and in the local caches (i.e., the caches in execution platform). The configuration and metadata manager 216 uses the metadata to determine which data micro-partitions need to be accessed to retrieve data for processing a particular task or job.

A monitor and workload analyzer 218 oversees processes performed by the compute service manager 201 and manages the distribution of tasks (e.g., workload) across the virtual warehouses and execution nodes in the execution platform. The monitor and workload analyzer 218 also redistributes tasks, as needed, based on changing workloads throughout a network based data warehouse system and may further redistribute tasks based on a user (e.g., "external") query workload that may also be processed by the execution platform.

Additionally, the configuration and metadata manager 216 may manage the information related to the data stored in the remote data storage devices and in the local caches. The monitor and workload analyzer 218 oversees the processes performed by the compute service manager 201 and manages the distribution of tasks (e.g., workload) across the virtual warehouses and execution nodes in the execution platform.

The configuration and metadata manager 216 and the monitor and workload analyzer 218 are coupled to a data storage device (a database 220). The data storage device in FIG. 2 represents any data storage device within the network based data warehouse system. For example, data storage device may represent caches in the execution platform, storage devices in a cloud computing storage platform, or any other storage devices.

In some cases, the compute service manager 201 may include other components or functionalities not expressly shown in FIG. 2. For example, the compute service manager 201 may further include an access manager and/or a key manager coupled to the database 220. The access manager may handle authentication and authorization tasks for the systems described herein. The key manager may manage storage and authentication of keys used during authentication and authorization tasks. The request processing service 202 manages, along with the access manager and/or the key manager, received data storage requests and data retrieval requests. The management console service 204 may collaboratively supports access to various systems and processes by administrators and other system managers.

The compute service manager 201 may also include a compute service manager that includes an SQL compiler, an SQL optimizer, and an SQL executor. The SQL compiler parses SQL queries and generates the execution code for the queries. The SQL optimizer determines the best method to execute queries based on the data that needs to be processed. The SQL executor executes the query code for queries received by resource manager. The job scheduler and coordinator 212 may send received queries to the appropriate services or systems for compilation, optimization, and dispatch to the compute service manager 201. The virtual warehouse manager 214 manages the operation (e.g., in view of the received queries or jobs) of multiple virtual warehouses implemented in an execution platform.

Figure 3:
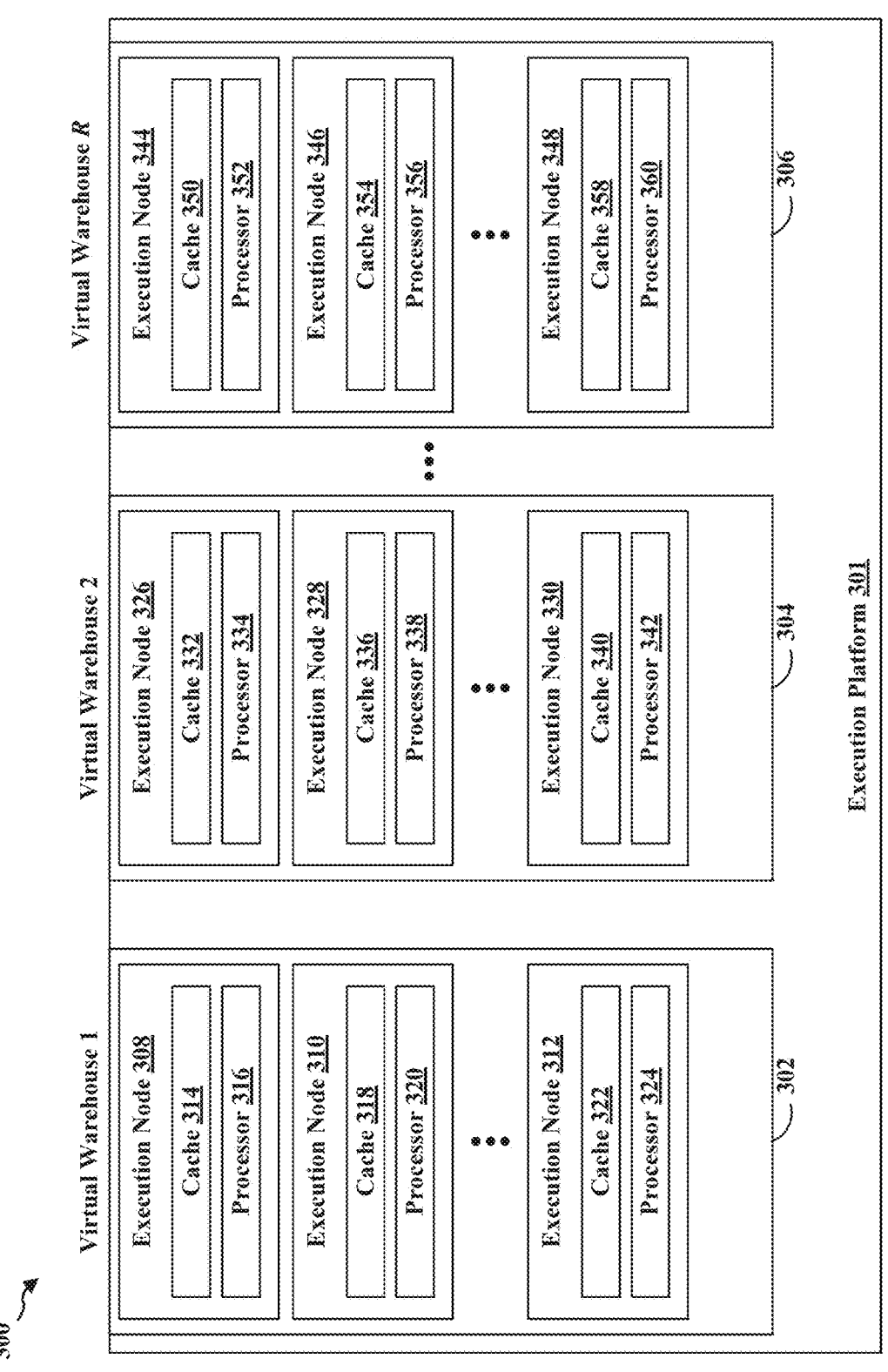
FIG. 3 is a block diagram depicting an embodiment of an execution platform in accordance with some embodiments of the present disclosure.

FIG. 3 is a block diagram 300 depicting an embodiment of an execution platform 301. As shown in FIG. 3, the execution platform 301 includes multiple virtual warehouses 302, 304, and 306 (e.g., from 1 to R, where R is a natural number). Each virtual warehouse includes multiple execution nodes that each includes a cache and a processor. Although each virtual warehouse 302, 304, 306 shown in FIG. 3 includes three execution nodes, a particular virtual warehouse may include any number of execution nodes without departing from the scope of the disclosure. Further, the number of execution nodes in a virtual warehouse is dynamic, such that new execution nodes are created when additional demand is present, and existing execution nodes are deleted when they are no longer necessary.

Each virtual warehouse 302, 304, 306 is capable of accessing data storage devices (e.g., the data storage 140 shown in FIG. 1). Thus, virtual warehouses 302, 304, 306 are not necessarily assigned to a specific data storage device and, instead, can access data from any of the data storage devices. Similarly, each of the execution nodes shown in FIG. 3 can access data from any of the data storage devices. In some embodiments, a particular virtual warehouse or a particular execution node may be temporarily assigned to a specific data storage device, but the virtual warehouse or execution node may later access data from any other data storage device.

In the example of FIG. 3, the virtual warehouse 302 includes three execution nodes 308, 310, and 312. The execution node 308 includes a cache 314 and a processor 316. Execution node 310 includes a cache 318 and a processor 320. The execution node 312 includes a cache 322 and a processor 324. Each execution node 308, 310, 312 is associated with processing one or more data storage and/or data retrieval tasks. For example, a particular virtual warehouse may handle data storage and data retrieval tasks associated with a particular user or customer. In other implementations, a particular virtual warehouse may handle data storage and data retrieval tasks associated with a particular data storage system or a particular category of data.

Similar to virtual warehouse 302 discussed above, the virtual warehouse 304 includes three execution nodes 326, 328, and 330. Execution node 326 includes a cache 332 and a processor 334. Execution node 328 includes a cache 336 and a processor 338. Execution node 330 includes a cache 340 and a processor 342. Additionally, virtual warehouse 306 includes three execution nodes 344, 346, and 348. Execution node 344 includes a cache 350 and a processor 352. Execution node 346 includes a cache 354 and a processor 356. Execution node 348 includes a cache 358 and a processor 360.

Although the execution nodes shown in FIG. 3 each include one cache and one processor, alternative embodiments may include execution nodes containing any number of processors and any number of caches. Additionally, the caches may vary in size among the different execution nodes. The caches shown in FIG. 3 store, in the local execution node, data that was retrieved from one or more data storage devices in a storage platform. Thus, the caches reduce or eliminate potential bottleneck problems occurring in platforms that consistently retrieve data from remote storage systems. Instead of repeatedly accessing data from the remote storage devices, the systems and methods described herein access data from the caches in the execution nodes which is significantly faster and avoids the bottleneck problem. In some embodiments, the caches are implemented using high-speed memory devices that provide fast access to the cached data. Each cache can store data from any of the storage devices in a storage platform.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. In some embodiments, the cache resources and computing resources associated with a particular execution node are determined when the execution node is created, based on the expected tasks to be performed by the execution node.

Additionally, the cache resources and computing resources associated with a particular execution node may change over time based on changing tasks performed by the execution node. For example, a particular execution node may be assigned more processing resources if the tasks performed by the execution node become more processor intensive. Similarly, an execution node may be assigned more cache resources if the tasks performed by the execution node require a larger cache capacity.

Although the virtual warehouses 302, 304, 306 are associated with the same execution platform, the virtual warehouses 302, 304, 306 of FIG. 3 may be implemented using multiple computing systems at multiple geographic locations. For example, the virtual warehouse 302 can be implemented by a computing system at a first geographic location, while the virtual warehouses 304 and 306 are implemented by another computing system at a second geographic location. In some embodiments, these different computing systems are cloud-based computing systems maintained by one or more different entities.

Additionally, each virtual warehouse is shown in FIG. 3 as having multiple execution nodes. The multiple execution nodes associated with each virtual warehouse may be implemented using multiple computing systems at multiple geographic locations. For example, a particular instance of the virtual warehouse 302 implements execution nodes 308 and 310 on one computing platform at a particular geographic location and implements execution node 312 at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse. The execution platform 301 is also fault tolerant. For example, if one virtual warehouse fails, that virtual warehouse is quickly replaced with a different virtual warehouse at a different geographic location.

A particular execution platform may include any number of virtual warehouses (in addition to the illustrated virtual warehouses 302, 304, 306). Additionally, the number of virtual warehouses in a particular execution platform is dynamic, such that new virtual warehouses are created when additional processing and/or caching resources are needed. Similarly, existing virtual warehouses may be deleted when the resources associated with the virtual warehouse are no longer necessary.

FIG. 4 is a diagram 400 illustrating an example of a first query plan 402 and an example of a second query plan 404 in accordance with some aspects of the present disclosure. In an example, the first query plan 402 and the second query plan 404 may pertain to classifying data in a table (described in greater detail below).

In the first query plan 402, at block 406, a computing system obtains a table. In some aspects, the computing system may obtain the table by performing a table scan operation. At block 408, the computing system samples the table. In some aspects, the computing system may include a first set of compute nodes, and the first set of compute nodes may perform the sampling (i.e., a sampling operation) at block 408. At block 410, the computing system samples the table again. In some aspects, the computing system may include a second set of compute nodes that is different from the first set of compute nodes, and the second set of compute nodes may perform the sampling at block 410. The two sampling operations may facilitate the samples being random. In some aspects, the one or both of the two sampling operations may produce a row count for the table. At block 412, the computing system executes an unpivot operation on the table. The unpivot operation may reduce a number of columns in the table and increase a number of rows in the table. At block 414, the computing system executes an extension function on the table. In some aspects, the extension function may be a user defined function (UDF). A UDF may refer to a scalar function that returns one output row for each input row, where the returned output row includes a single column/value. A UDF may determine a type of input data (e.g., string, int, date, etc.) per cell. In contrast, a UDTF may refer to a tabular function that returns a tabular value for each input row. A UDTF may include precomputed information that may be utilized for a full table during a pivot operation. As such, a UDTF may skip the computation of the information when the UDTF is executed. A UDF may process files serially, whereas a UDTF may process multiple files in parallel. As a UDF may process files serially, a non-uniform distribution may result due to the presence of nulls or empty values. During startup of both UDFs and UDTFs, an amount of work to load libraries may be performed. Each UDF may load the libraries which may increase overhead, whereas for UDTFs, the libraries may be loaded once. At block 416, the computing system flattens the table. Flattening the table may reduce a number of columns in the table and increase a number of rows in the table. At block 418, the computing system sorts the table. At block 420, the computing system flattens the table again. At block 422, the computing system performs an aggregate operation on the table. The aggregate operation may format data in the table. At block 424, the computing system performs another aggregate operation on the table. At block 426, the computing system performs a further aggregate operation on the table. At block 428, the computing system obtains a result for the first query plan 402.

In the second query plan 404, at block 430, the computing system obtains a table. At block 432, the computing system samples the table. In some aspects, the computing system may include a first set of compute nodes, and the first set of compute nodes may perform the sampling (i.e., a sampling operation) at block 432. At block 434, the computing system samples the table again. In some aspects, the computing system may include a second set of compute nodes that is different from the first set of compute nodes, and the second set of compute nodes may perform the sampling at block 434. The two sampling operations may facilitate the samples being random. In some aspects, the one or both of the two sampling operations may produce a row count for the table. At block 436, the computing system executes an unpivot operation on the table. The unpivot operation may reduce a number of columns in the table and increase a number of rows in the table. At block 438, the computing system executes a UDTF on the table. In an example, the UDTF may classify data in the table. At block 440, the computing system performs an aggregate operation on the table and produces results for the second query plan 404. The second query plan 404 may pertain to efficient computation over a wide table as described herein. The second query plan 404 may be more efficient than the first query plan 402.

Figure 5:
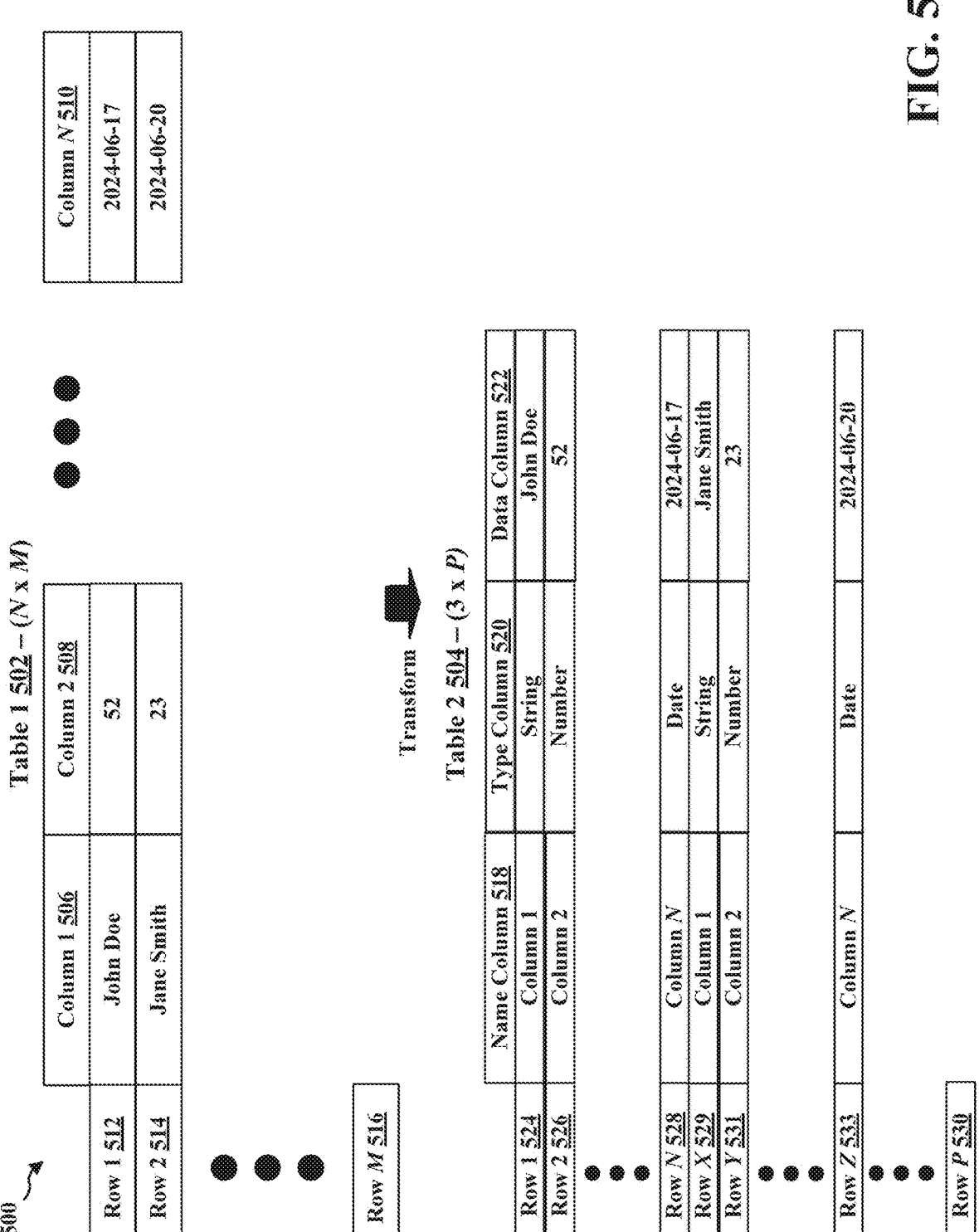
FIG. 5 is a diagram illustrating an example of a first table and an example of a second table in accordance with some aspects of the present disclosure.

FIG. 5 is a diagram 500 illustrating an example of a first table 502 and an example of a second table 504 in accordance with some aspects of the present disclosure. In an example, the first table 502 and the second table 504 are associated with or included in a data exchange. In an example, the first table 502 may have dimensions of N×M (N and M are positive integers), that is, the first table may include N columns and M rows. In an example, N is 1,000 and M is 10,000. In an example, the first table 502 may include a first column 506, a second column 508, and an Nth column 510. In an example, the first column 506 may be assigned to or indicate "Name," the second column 508 may be assigned to or indicate "Age," and the Nth column 510 may be assigned to or indicate "Date." In an example, the first table 502 may include a first row 512, a second row 514, and an Mth row 516. A field (which may also be referred to as a cell or an entry) specified by a row and column may include data. As depicted in the diagram 500, the first row 512 and the first column 506 specify a field that includes "John Doe" (e.g., a String data type), the first row 512 and the second column 508 specify a field that includes "52" (e.g., a Number data type), and the first row 512 and the Nth column 510 specify a field that includes "2024 Jun. 17" (e.g., a Date data type). Furthermore, the second row 514 and the first column 506 specify a field that includes "Jane Smith," the second row 514 and the second column 508 specify a field that includes "23," and the second row 514 and the Nth column 510 specify a field that includes "2024 Jun. 20." Although fields for the Mth row 516 are not depicted in the diagram 500, it is to be understand that the Mth row 516 and the first column 506 specify a field that includes data (e.g., a name), the Mth row 516 and the second column 508 specify a field that includes additional data (e.g., an age), and the Mth row 516 and the Nth column 510 specify a field that includes further data (e.g., a date).

A computing system may determine a number of columns in the first table 502. The computing system may compare the number of columns in the first table 502 to a threshold number of columns. In an example, the threshold number of columns may range from "200-1000." In a specific example, the threshold number of columns is "500." If the number of columns is greater than the threshold number of columns, the computing system may transform the first table 502 into the second table 504. Transforming the first table 502 into the second table 504 may include executing an unpivot operation on the first table 502. In contrast to some other types of unpivot operations that convert a set of columns to a row with two entries (row name, row value), the unpivot operation as described herein adds an extra column (a type column) that is indicative of a type (i.e., a data type). When a UDTF is executed, the type column may enable the UDTF to skip type determination, which may improve an execution time for the UDTF. In some aspects, the computing system may sample the first table 502 to obtain a row count of the first table 502. In some aspects, the computing system may identify a data type of each column of the first table 502 prior to or concurrently with transforming the first table 502 into the second table 504. In an example, the computing system may identify the data type of each column of the first table 502 based on metadata for the first table 502, another table that specifies data of the first table 502, and/or based on a function that returns data types.

In an example, the second table 504 may have dimensions of 3×P (P is a positive integer that is equal to N×M), that is, the second table 504 may include 3 columns and P rows. In an example, P is "10,000,000." In an example, the second table 504 may include a name column 518, a type column 520, and a data column 522. The name column 518 may include fields that specify identifiers (i.e., names) for columns in the first table 502. For instance, as depicted in the diagram 500, the name column 518 includes "Column 1," "Column 2," and "Column N." The type column 520 may include fields that specify data types for columns in the first table 502. For instance, as depicted in the diagram 500, the type column 520 includes "String," "Number," and "Date." The data column 522 may include fields that include data of the first table 502. For instance, as depicted in the diagram 500, the data column 522 includes "John Doe," "52," "2024 Jun. 17," "Jane Smith," "23," and "2024 Jun. 20." The second table 504 may include a first row 524, a second row 526, and an Nth row 528. The second table 504 may also include an Xth row 529, a Yth row 531, and a Zth row 533 (X, Y, and Z are positive integers greater than N). The second table 504 may also include a Pth row 530.

As depicted in the diagram 500, the second table 504 includes data similar to that of the first table 502; however, the second table 504 includes a number of columns (3) that is less than a number of columns of the first table 502(N) so as to facilitate column-by-column processing. For instance, as depicted in the diagram 500, the first row 524, the second row 526, and the Nth row 528 encapsulate information corresponding to the first row 512 of the first table, but with a number of columns (3) that is less than N. In an example, the computing system may execute a UDTF on the second table 504 in order to process the second table 504. The UDTF may be optimized on a column basis. As such, the computing system may process a column in the second table 504 in a parallel nature when executing the UDTF, which may reduce a time of execution compared to executing the UDTF on the first table 502.

As indicated above, the computing system may transform the first table 502 into the second table 504 when the number of columns of the first table 502 is greater than a threshold number of columns. In some aspects, the threshold number of columns may be experimentally determined. For example, the computing system may obtain and execute a query plan on a table (e.g., the first table 502). A query plan may refer to one or more functions executed on the table. The query plan may include a UDTF. The computing system may execute the query plan on the table (without transforming the table as described above) and record a first time of execution of the query plan. The computing system may also execute the query plan on the table (while transforming the table as described above) and record a second time of execution of the query plan. If the first time of execution is less than the second time of execution, the computing system may determine that the threshold number of columns should be greater than a number of columns of the table. In an example, the computing system may update the table to include an additional column and the computing system may execute the query plan without transforming the table and with transforming the table as described above. The computing system may repeat this process of adding a column and executing the query plan with and without the transformation until a time of execution of the query plan without the transformation is greater than a time of execution of the query plan with the transformation. When the time of execution of the query plan without the transformation is greater than the time of execution of the query plan with the transformation, the computing system may determine that the threshold number of columns is a number of columns of a table (e.g., a most recently tested table).

Figure 6:
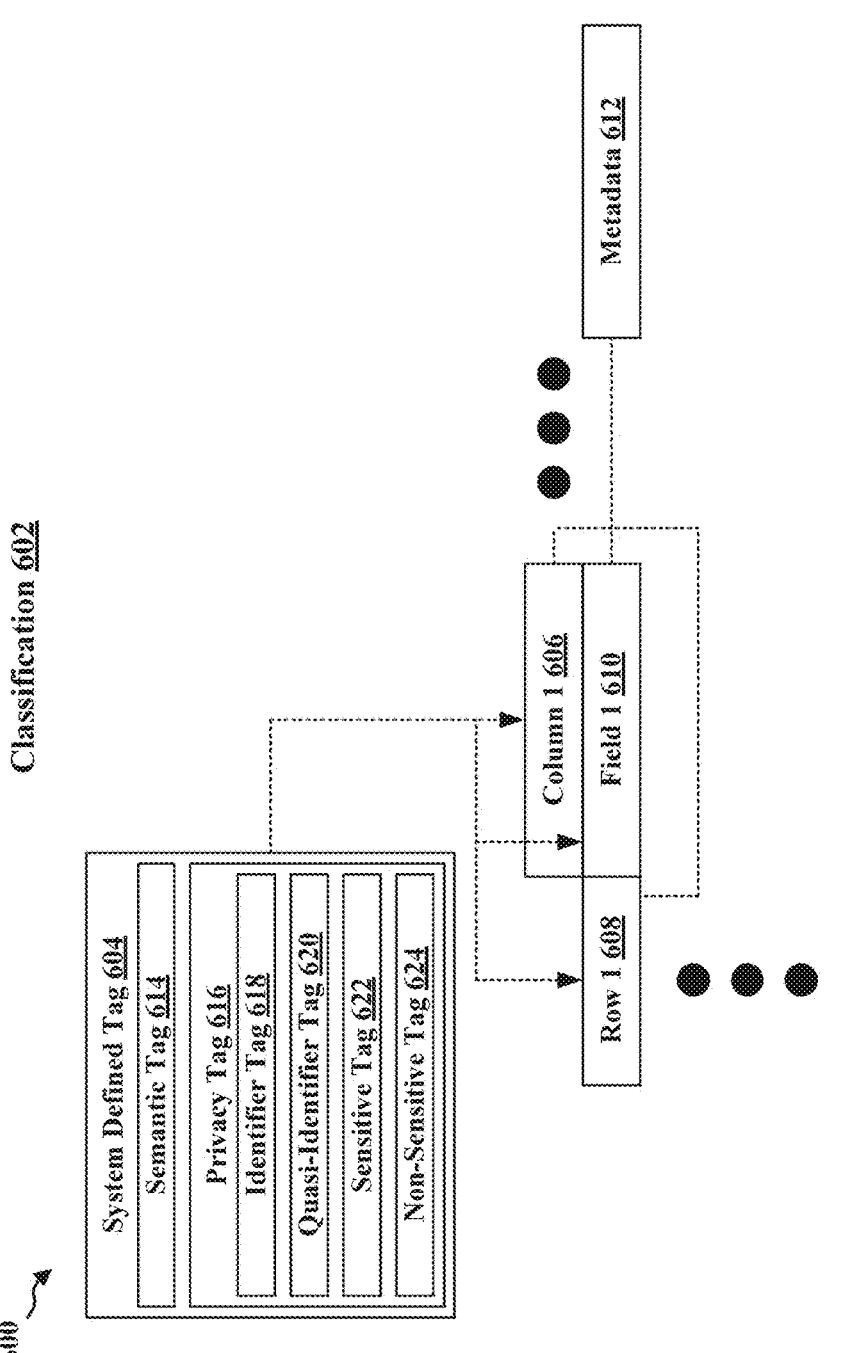
FIG. 6 is a diagram illustrating an example of classification in accordance with some aspects of the present disclosure.

FIG. 6 is a diagram 600 illustrating an example of classification 602 in accordance with some aspects of the present disclosure. Classification may refer to a process by which a computing system associates system defined tags to columns of a table by analyzing fields of the table and metadata of the table for personal data. Classification may facilitate compliance with data privacy regulations. For instance, classifying column data can inform identity and access management administrators to evaluate and maintain role hierarchies to ensure that roles have appropriate access to data, such as personally identifiable information (PII). Classification may help to identify and confirm a storage location of PII. A data sharing provider may use classification to determine whether or not to share data and how to make PII available to a data sharing consumer. Usage of columns that include PII may help to determine an approach to protect the PII with a masking policy and/or a row access policy. In some aspects, the computing device may perform classification by executing a UDTF (i.e., "a classification UDTF") on a table.

Personal data may be or include an identifier for an individual (or an entity), a quasi-identifier of the individual (or the entity), or sensitive information of the individual (or the entity). An identifier for an individual (or an entity) may be an attribute that uniquely identifies an individual (or the entity). Examples of such attributes may include a name, a social security number, a phone number, a passport number, or a bank account number. A quasi-identifier of an individual (or an entity) may be or include an attribute that can uniquely identify an individual (or the entity) when two or more of such attributes are in combination. Examples of such attributes may include an age, a gender, or a city. Sensitive information of an individual (or an entity) may be or include attributes that cannot identify an individual (or the entity), but that the individual (or the entity) would not like to disclose for privacy reasons. Examples of such attributes may include a salary of an individual.

In the classification 602, a computing system may associate a system defined tag 604 to one or more of a first column 606, a first row 608, or a first field 610 of a table. In an example, the table may be or include the second table 504. The computing system may associate the system defined tag 604 based on metadata 612 for one or more of the first column 606, the first row 608, the first field 610, or the table itself. In an example, the system defined tag 604 may be stored as a key-value pair, where the value is a string.

The system defined tag 604 may be or include a semantic tag 614 and/or a privacy tag 616. The semantic tag 614 may identify personal attributes such as name, age, and/or gender. The privacy tag 616 may be an identifier tag 618, a quasi-identifier tag 620, a sensitive tag 622, or a non-sensitive tag 624. The identifier tag 618 may indicate that a column/row/field of a table includes attributes that uniquely identify an individual (or an entity), such as a name, a social security number, or a phone number. The quasi-identifier tag 620 may indicate that the column/row/field of the table includes attributes (e.g., age and gender) that can uniquely identify an individual (or an entity) when the attributes are combined with attributes. The sensitive tag 622 may indicate that the column/row/field includes attributes that do not identify an individual (or an entity), but that the individual (or the entity) would not like to disclose for privacy reasons. The non-sensitive tag 624 may indicate that the column/ row/field does not include attributes with personal or sensitive information. In some aspects, the system defined tag 604 may be defined by a data exchange.

FIG. 7 is a diagram 700 illustrating an example of a computing system 702 in accordance with some aspects of the present disclosure. The computing system 702 includes a processing device 704 and memory 706. The memory 706 may store wide table processing instructions 708 for implementing efficient computation over a wide table as described herein. The computing system 702 also includes storage 710. In some aspects, the storage 710 may be or include the memory 706. In some aspects, the storage 710 may be separate from the memory 706. In some aspects, a portion of the memory 706 may include the storage 710. In some aspects, the storage 710 may be or include hard-disk drive(s) (HDD(s)) or solid-state drive(s) (SSD(s)). The storage 710 may store a first table 712, a second table 714, a UDTF 716, and/or a system defined tag 718. In some aspects, the computing system 702 may be part of the cloud computing platform 110.

The wide table processing instructions 708, when executed by the processing device 704, cause the processing device 704 to determine that a first number of columns of a first table is greater than a threshold number of columns. The wide table processing instructions 708, when executed by the processing device 704, cause the processing device 704 to transform the first table 712 into the second table 714 based on the determination, where the second table 714 includes a second number of columns that is less than the first number of columns, and where the second table 714 includes a first column that includes first fields that identify columns of the first table 712, a second column that includes second fields that identify data types of fields of the first table 712, and a third column that includes third fields that include data of the fields of the first table 712. The wide table processing instructions 708, when executed by the processing device 704, cause the processing device 704 to execute the UDTF 716 on the second table 714. In some aspects, executing the UDTF 716 on the second table 714 may include identifying personal data in a row of the second table 714 corresponding to a column in the first table 712 and associating the row with the system defined tag 718 based on the identification.

FIG. 8 is a flow diagram of a method 800 for efficient computation over a wide table in accordance with some embodiments of the present disclosure. The method 800 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 800 may be performed by the processing device 704. In some embodiments, the method 800 may be performed by the machine illustrated in FIG. 9. In some embodiments, the method 800 may be performed by the cloud computing platform 110, the cloud computing service 112, and/or the cloud services 120. In some embodiments, the method 800 may be performed by the virtual warehouse 131.

At block 802, the processing device determines that a first number of columns of a first table is greater than a threshold number of columns. In an example, the first table may be or include the first table 502. In an example, the first number of columns may be "1000." In another example, the first table may be or include the first table 712. In an example, the threshold number of columns may be "500."

At block 804, the processing device transforms the first table into a second table based on the determination, where the second table includes a second number of columns that is less than the first number of columns, and where the second table includes a first column that includes first fields that identify columns of the first table, a second column that includes second fields that identify data types of fields of the first table, and a third column that includes third fields that include data of the fields of the first table. In an example, the second table may be or include the second table 504. In another example, the second table may be or include the second table 714. In an example, the first column may be the name column 518, the second column may be the type column 520, and the third column may be the data column 522. In an example, the second number of columns may be "3." In an example, transforming the first table into the second table may correspond to block 436 in FIG. 4.

At block 806, the processing device executes a UDTF on the second table. In an example, the UDTF may be or include the UDTF 716. In another example, executing the UDTF may correspond to block 438 in FIG. 4.

In some aspects, the processing device may obtain the first table prior to determining that the first number of columns is greater than the threshold number of columns. In an example, the aforementioned aspects may correspond to block 430 in FIG. 4.

In some aspects, executing the UDTF on the second table may include executing a classification UDTF on the second table. In an example, the aforementioned aspects may correspond to the classification 602 in FIG. 6.

In some aspects, executing the classification UDTF on the second table may include identifying personal data in row of the second table corresponding to a column in the first table and associating the row with a system defined tag based on the identification. In an example, the system defined tag may be or include the system defined tag 604.

In some aspects, the personal data may include an identifier of an individual, a quasi-identifier of the individual, or sensitive information of the individual. In an example, the aforementioned aspects may correspond to the identifier tag 618, the quasi-identifier tag 620, or the non-sensitive tag 624.

In some aspects, the processing device may output results of the executed UDTF to a computing device. In an example, the computing device may be included in the user devices 101-104. In an example, outputting the results of the executed UDTF may include transmitting the results and/or storing the results.

In some aspects, executing the UDTF on the second table may include executing the UDTF on a column-by-column basis on the second table. For example, executing the UDTF on the second table may include executing the UDTF on the name column 518, followed by the type column 520, followed by the data column 522.

In some aspects, the processing device may obtain, based on the execution of the UDTF, a tabular value for each row of the second table. For example, executing the UDFT on the second table 504 may cause the processing device to obtain a tabular value for each row of the second table 504.

In some aspects, transforming the first table into the second table may include executing an unpivot operation on the first table. For example, the aforementioned aspects may correspond to block 436 in FIG. 4.

In some aspects, the processing device may sample the first table to obtain a row count of the first table, where executing the UDTF may be further based on the row count. For example, the aforementioned aspects may correspond to block 432 and/or block 434 in FIG. 4.

In some aspects, transforming the first table into the second table may include transforming the first table into the second table at an execution platform, and executing the UDTF on the second table may include executing the UDTF on the second table at the execution platform. For example, the execution platform may be an execution platform described herein.

Figure 9:
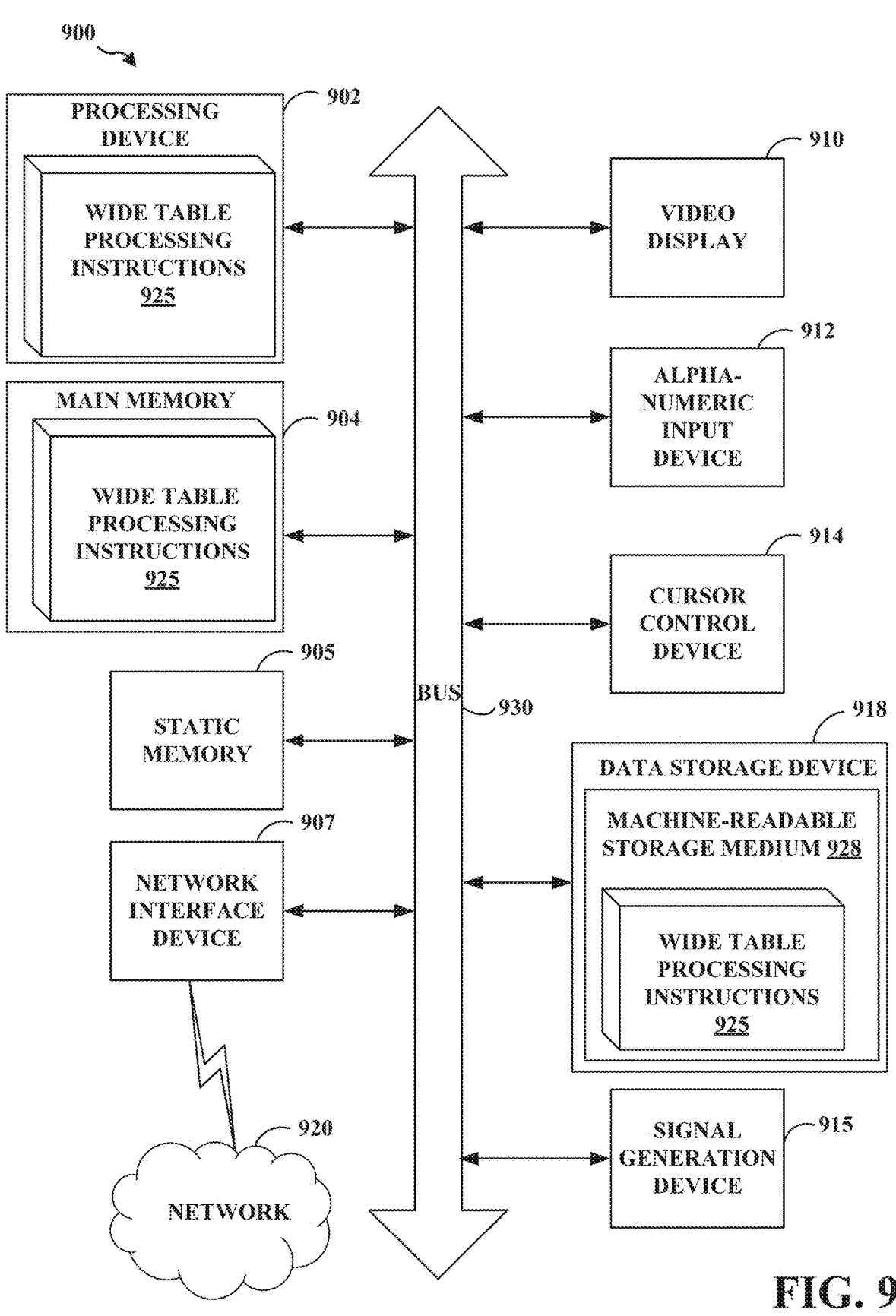
FIG. 9 is a block diagram of an example computing device that may perform one or more of the operations described herein in accordance with some aspects of the present disclosure.

FIG. 9 illustrates a diagrammatic representation of a machine in the example form of a computer system 900 within which includes a set of instructions for causing the machine to perform any one or more of the methodologies discussed herein for efficient computation over a wide table.

In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, a hub, an access point, a network access control device, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, the computer system 900 may be representative of a server.

The computer system 900 includes a processing device 902, a main memory 904 (e.g., read-only memory (ROM), flash memory, dynamic random access memory (DRAM), a static memory 905 (e.g., flash memory, static random access memory (SRAM), etc.), and a data storage device 918, which communicate with each other via a bus 930. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

The computer system 900 may further include a network interface device 907 which may communicate with a network 920. The computer system 900 also may include a video display unit 910 (e.g., a liquid crystal display (LCD) or a cathode ray tube (CRT)), an alpha-numeric input device 912 (e.g., a keyboard), a cursor control device 914 (e.g., a mouse), and an acoustic signal generation device 915 (e.g., a speaker). In one embodiment, the video display unit 910, the alpha-numeric input device 912, and the cursor control device 914 may be combined into a single component or device (e.g., an LCD touch screen).

The processing device 902 represents one or more general-purpose processing devices such as a microprocessor, a central processing unit (CPU), or the like. More particularly, the processing device 902 may be a complex instruction set computing (CISC) microprocessor, a reduced instruction set computer (RISC) microprocessor, a very long instruction word (VLIW) microprocessor, or a processor implementing other instruction sets, or processors implementing a combination of instruction sets. The processing device 902 may also be one or more special-purpose processing devices, such as an application specific integrated circuit (ASIC), a field programmable gate array (FPGA), a digital signal processor (DSP), network processor, or the like. The processing device 902 is configured to execute wide table processing instructions 925, for performing the operations and steps discussed herein. The wide table processing instructions 925 may further include instructions for determining that a first number of columns of a first table is greater than a threshold number of columns. The wide table processing instructions 925 may further include instructions for transforming, by a processing device, the first table into a second table based on the determination, where the second table includes a second number of columns that is less than the first number of columns, and where the second table includes a first column that includes first fields that identify columns of the first table, a second column that includes second fields that identify data types of fields of the first table, and a third column that includes third fields that include data of the fields of the first table. The wide table processing instructions 925 may further include instructions for executing a UDTF on the second table.

The computer system 900 may include a data storage device 918. The data storage device 918 may include a machine-readable storage medium 928. The machine-readable storage medium 928 may store the wide table processing instructions 925 (e.g., software) embodying any one or more of the methodologies of functions described herein. The wide table processing instructions 925 may also reside, completely or at least partially, within the main memory 904 or within the processing device 902 during execution thereof by the computer system 900; the main memory 904 and the processing device 902 also constituting machine-readable storage media. The wide table processing instructions 925 may further be transmitted or received over the network 920 via the network interface device 907.

The machine-readable storage medium 928 may also be used to store instructions to perform the methods described herein. While the machine-readable storage medium 928 is shown in an exemplary embodiment to be a single medium, the term "machine-readable storage medium" should be taken to include a single medium or multiple media (e.g., a centralized or distributed database, or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

Unless specifically stated otherwise, terms such as "receiving," "routing," "granting," "determining," "publishing," "providing," "designating," "encoding," "obtaining," "transforming," "generating," "executing," "identifying," "associating," "classifying," "inputting," "outputting," "transmitting," "sampling," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/ component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present disclosure may be written in any combination of one or more programming languages. Such code may be compiled from source code to computer-readable assembly language or machine code suitable for the device or computer on which the code will be executed.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned (including via virtualization) and released with minimal management effort or service provider interaction and then scaled accordingly. A cloud model can be composed of various characteristics (e.g., on-demand self-service, broad network access, resource pooling, rapid elasticity, and measured service), service models (e.g., Software as a Service ("SaaS"), Platform as a Service ("PaaS"), and Infrastructure as a Service ("IaaS")), and deployment models (e.g., private cloud, community cloud, public cloud, and hybrid cloud).

The flow diagrams and block diagrams in the attached figures illustrate the architecture, functionality, and operation of possible implementations of systems, methods, and computer program products according to various embodiments of the present disclosure. In this regard, each block in the flow diagrams or block diagrams may represent a module, segment, or portion of code, which comprises one or more executable instructions for implementing the specified logical function(s). It will also be noted that each block of the block diagrams or flow diagrams, and combinations of blocks in the block diagrams or flow diagrams, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flow diagram and/or block diagram block or blocks.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method, comprising:

determining that a first number of columns of a first table in a column-oriented database is greater than a threshold number of columns, wherein the first table includes data in fields;

transforming, by a processing device, the first table into a second table in the column-oriented database based on the determination that the first number of columns of the first table in the column-oriented database is greater than the threshold number of columns, wherein the second table comprises a second number of columns that is less than the first number of columns, and wherein the second table comprises a first column that includes first fields that identify columns of the first table, a second column that includes second fields that identify data types of the fields of the first table, and a third column that includes third fields that include the data of the fields of the first table; and executing a user-defined table function (UDTF) optimized for columnar data processing on the second table in the column-oriented database, wherein executing the UDTF on the second table comprises executing a classification UDTF on the second table, and wherein executing the classification UDTF on the second table comprises:

identifying personal data in a row of the second table corresponding to a column in the first table; and associating the row with a system defined tag based on the identification.

2. The method of claim 1, further comprising:

obtaining the first table prior to determining that the first number of columns of the first table is greater than the threshold number of columns.

3. The method of claim 1, wherein the personal data comprises an identifier of an individual, a quasi-identifier of the individual, or sensitive information of the individual.

4. The method of claim 1, further comprising:

outputting results of the executed UDTF to a computing device.

5. The method of claim 1, wherein executing the UDTF on the second table comprises executing the UDTF on a column-by-column basis on the second table.

6. The method of claim 1, further comprising:

obtaining, based on the execution of the UDTF, a tabular value for each row of the second table.

7. The method of claim 1, wherein transforming the first table into the second table comprises executing an unpivot operation on the first table.

8. The method of claim 1, further comprising:

sampling the first table to obtain a row count of the first table, wherein executing the UDTF is based on the row count.

9. The method of claim 1, wherein the first table comprises a first number of rows and the second table comprises a second number of rows, and wherein the first number of rows is less than the second number of rows.

10. The method of claim 1, wherein transforming the first table into the second table comprises transforming the first table into the second table at an execution platform, and wherein executing the UDTF on the second table comprises executing the UDTF on the second table at the execution platform.

11. A system, comprising:

a memory; and a processing device operatively coupled to the memory, the processing device to:

determine that a first number of columns of a first table in a column-oriented database is greater than a threshold number of columns, wherein the first table includes data in fields;

transform the first table into a second table in the column-oriented database based on the determination that the first number of columns of the first table in the column-oriented database is greater than the threshold number of columns, wherein the second table comprises a second number of columns that is less than the first number of columns, and wherein the second table comprises a first column that includes first fields that identify columns of the first table, a second column that includes second fields that identify data types of the fields of the first table, and a third column that includes third fields that include the data of the fields of the first table; and execute a user-defined table function (UDTF) on the second table optimized for columnar data processing in the column-oriented database, wherein to execute the UDTF on the second table, the processing device is to execute a classification UDTF on the second table, and wherein to execute the classification UDTF on the second table, the processing device is to:

identify personal data in a row of the second table corresponding to a column in the first table; and associate the row with a system defined tag based on the identification.

12. The system of claim 11, wherein to execute the UDTF on the second table, the processing device is to execute the UDTF on a column-by-column basis on the second table.

13. The system of claim 11, wherein the personal data comprises an identifier of an individual, a quasi-identifier of the individual, or sensitive information of the individual.

14. The system of claim 11, wherein the processing device is further to:

output results of the executed UDTF to a computing device.

15. The system of claim 11, wherein the first table comprises a first number of rows and the second table comprises a second number of rows, and wherein the first number of rows is less than the second number of rows.

16. A non-transitory computer-readable medium having instructions stored thereon which, when executed by a processing device, cause the processing device to:

determine that a first number of columns of a first table is greater than a threshold number of columns;

transform, by the processing device, the first table into a second table based on the determination, wherein the second table comprises a second number of columns that is less than the first number of columns, and wherein the second table comprises a first column that includes first fields that identify columns of the first table, a second column that includes second fields that identify data types of fields of the first table, and a third column that includes third fields that include data of the fields of the first table; and execute a user-defined table function (UDTF) on the second table, wherein to execute the UDTF on the second table, the instructions, when executed by the processing device, cause the processing device to execute a classification UDTF on the second table, and wherein to execute the classification UDTF on the second table, the instructions, when executed by the processing device, cause the processing device to:

identify personal data in a row of the second table corresponding to a column in the first table; and associate the row with a system defined tag based on the identification.

17. The non-transitory computer-readable medium of claim 16, wherein to execute the UDTF on the second table, the instructions, when executed by the processing device, cause the processing device to execute the UDTF on a column-by-column basis on the second table.

18. The non-transitory computer-readable medium of claim 16, wherein the personal data comprises an identifier of an individual, a quasi-identifier of the individual, or sensitive information of the individual.

19. The non-transitory computer-readable medium of claim 16, wherein the instructions, when executed by the processing device, cause the processing device further to:

output results of the executed UDTF to a computing device.

20. The non-transitory computer-readable medium of claim 16, wherein the first table comprises a first number of rows and the second table comprises a second number of rows, and wherein the first number of rows is less than the second number of rows.

\* \* \* \* \*